United States Patent
Hwang et al.

(10) Patent No.: US 8,243,840 B2
(45) Date of Patent: Aug. 14, 2012

(54) METHOD AND SYSTEM FOR TRANSMITTING/RECEIVING DATA IN A COMMUNICATION SYSTEM

(75) Inventors: In-Soo Hwang, Gyeongsan-si (KR); Cheol-Woo You, Seoul (KR); Jin-Gon Joung, Seoul (KR); Yong-Hoon Lee, Daejeon (KR); Yong-Up Jang, Changwon-si (KR); Won-Yong Shin, Yongin-si (KR)

(73) Assignees: Samsung Electronics Co., Ltd (KR); Korea Advanced Institute of Science & Technology (KAIST) (KR)

( * ) Notice: Subject to any disclaimer, the term of this patent is extended or adjusted under 35 U.S.C. 154(b) by 926 days.

(21) Appl. No.: 11/703,598

(22) Filed: Feb. 7, 2007

(65) Prior Publication Data

US 2007/0201576 A1    Aug. 30, 2007

(30) Foreign Application Priority Data

Feb. 7, 2006 (KR) .................. 10-2006-0011672

(51) Int. Cl.
*H04L 1/02* (2006.01)
(52) U.S. Cl. .................. 375/267; 375/260; 375/299
(58) Field of Classification Search .................. 375/267, 375/260, 299; 455/132, 504
See application file for complete search history.

(56) References Cited

U.S. PATENT DOCUMENTS

| 5,982,825 | A | 11/1999 | Tsujimoto | |
|---|---|---|---|---|
| 7,039,001 | B2 * | 5/2006 | Krishnan et al. | 370/203 |
| 7,068,981 | B2 * | 6/2006 | Sim | 455/101 |
| 7,492,830 | B2 * | 2/2009 | Bocquet | 375/267 |
| 2005/0130694 | A1 * | 6/2005 | Medvedev et al. | 455/522 |
| 2005/0164658 | A1 | 7/2005 | Oh et al. | |
| 2005/0249304 | A1 * | 11/2005 | Takano et al. | 375/267 |
| 2006/0013250 | A1 | 1/2006 | Howard et al. | |
| 2006/0189280 | A1 * | 8/2006 | Goldberg | 455/101 |

FOREIGN PATENT DOCUMENTS

| KR | 100703263 | 3/2007 |
|---|---|---|
| WO | WO 2005/053186 | 6/2005 |

OTHER PUBLICATIONS

Sinan Gezici et al ("Optimum and suboptimal finger selection algorithms for MMSE rake receivers in impulse radio Ultra-wideband systems", Eurasip journal on wireless communications and Networking vol. 2006, article ID 84249, pp. 1-10)*

* cited by examiner

*Primary Examiner* — Shuwang Liu
*Assistant Examiner* — Helene Tayong
(74) *Attorney, Agent, or Firm* — The Farrell Law Firm, P.C.

(57) ABSTRACT

Provided are a system and a method for transmitting/receiving data in a communication system. The method includes calculating a processing matrix of a transmission unit for transmitting data, a processing matrix of a reception unit for receiving the data, a channel matrix formed by a plurality of transmission antennas and a plurality of reception antennas, and a parameter of the transmission data, when the data to be transmitted to the plurality of reception antennas via the plurality of transmission antennas is generated; determining a minimum value of a Minimum Mean Square Error (MMSE) according to the calculated matrixes and parameter; and transmitting/receiving the data using an MMSE multiplexing scheme based on the determined minimum MMSE value.

16 Claims, 2 Drawing Sheets

METHOD AND SYSTEM FOR TRANSMITTING/RECEIVING DATA IN A COMMUNICATION SYSTEM

PRIORITY

This application claims priority under 35 U.S.C. §119(a) of a Korean Patent Application filed in the Korean Intellectual Property Office on Feb. 7, 2006 and assigned Serial No. 2006-11672, the entire contents of which are incorporated herein by reference.

BACKGROUND OF THE INVENTION

1. Field of the Invention

The present invention relates generally to a communication system, and in particular, to a method and system for transmitting/receiving data in a Multi-Input Multi-Output (MIMO) communication system.

2. Description of the Related Art

The key issue in communication is how efficiently and reliably is it possible to transmit data through a channel. In the next generation multimedia communication system, there is ongoing research to meet the need for a high-speed communication system capable of processing and transmitting a variety of information such as image and radio data, beyond the early voice-oriented service, because it is essential to increase the system efficiency using a channel coding scheme suitable for the system.

However, a wireless channel environment in the communication system, unlike the wired channel environment, suffers inevitable errors due to several factors, such as multipath interference, shadowing, radio attenuation, time-varying noise, interference, fading, and the like, and occurrence of the errors causes information loss. The information loss brings considerable distortion on actual transmission signals, causing a reduction in the entire performance of the communication system. Generally, in order to reduce information loss, various error control techniques are used according to channel characteristics to increase system reliability, and the most typical error control technique uses error correction codes.

Further, in order to remove communication instability due to fading, a diversity scheme is used, and the diversity scheme is roughly classified into a time diversity scheme, a frequency diversity scheme, and an antenna diversity scheme, i.e. space diversity scheme.

The antenna diversity scheme, a scheme using multiple antennas, is classified into a reception antenna diversity scheme using a plurality of reception antennas, a transmission antenna diversity scheme using a plurality of transmission antennas, and a Multiple Input Multiple Output (MIMO) scheme using a plurality of reception antennas and a plurality of transmission antennas.

In the MIMO communication system, Space-Time Coding (STC) determines what data it will transmit for each of the plurality of transmission antennas, and each of the reception antennas receives the signal transmitted from each of the transmission antennas and performs STC decoding thereon. The STC coding is implemented with a space-time transmit diversity technique for encoding the same data in different formats to transmit the same data via different transmission antennas, or a spatial multiplexing technique for transmitting different data via different transmission antennas.

Generally, in the spatial multiplexing technique, an STC-coded signal is decoded at a receiver using a joint or separate detection scheme. The joint detection scheme should take into account not only the signal transmitted from one transmission antenna, but also the signals transmitted from other transmission antennas. Due to this characteristic, multiplexing techniques such as Minimum Mean Square Error (MMSE), and Zero-Forcing (ZF)-based Joint-Channel Diagonalization (JCD), are well known as a multiplexing scheme for using the spatial multiplexing MIMO communication system.

Among the multiplexing techniques, the JCD-based multiplexing technique obtains higher data throughput compared with the MMSE-based multiplexing technique at a high Signal-to-Noise Ratio (SNR). On the contrary, at a low SNR, the MMSE-based multiplexing technique can obtain higher throughput performance compared with the JCD-based multiplexing technique. However, because the communication system generally multiplexes data using one multiplexing technique, it cannot use a multiplexing technique corresponding to a varying SNR in a time-varying wireless channel environment, causing performance degradation. In addition, the MMSE and JCD-based multiplexing techniques considerably increase in the system complexity, as the number of transmission antennas and the number of reception antennas increase.

SUMMARY OF THE INVENTION

It is, therefore, an aspect of the present invention is to address at least the problems and/or disadvantages described above-herein and to provide at least the advantages described below. Accordingly, an aspect of the present invention is to provide a method and system for transmitting/receiving data in a communication system.

Another aspect of the present invention is to provide a data transmission/reception method and system for preventing degradation of system performance while reducing system complexity in a MIMO-based communication system.

According to an aspect of the present invention, there is provided a method for transmitting/receiving data in a communication system. The method includes calculating a processing matrix of a transmission unit for transmitting data, a processing matrix of a reception unit for receiving the data, a channel matrix formed by a plurality of transmission antennas and a plurality of reception antennas, and a parameter of the transmission data, when the data to be transmitted to the plurality of reception antennas via the plurality of transmission antennas is generated; determining a minimum value of a Minimum Mean Square Error (MMSE) according to the calculated matrixes and parameter; and transmitting/receiving the data using an MMSE multiplexing scheme based on the determined minimum MMSE value.

According to another aspect of the present invention, there is provided a system for transmitting/receiving data in a communication system. The system includes a transmitter for calculating a processing matrix of a transmission unit for transmitting data, a processing matrix of a reception unit for receiving the data, a channel matrix formed by a plurality of transmission antennas and a plurality of reception antennas, and a parameter of the transmission data, when the data to be transmitted to the plurality of reception antennas via the plurality of transmission antennas is generated, determining a minimum value of a Minimum Mean Square Error (MMSE) according to the calculated matrixes and parameter, and transmitting/receiving the data using an MMSE multiplexing scheme based on the determined minimum MMSE value.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the accompanying drawings. In the following description, a detailed description of known functions and configurations incorporated herein has been omitted for clarity and conciseness.

The present invention provides a method and system for transmitting/receiving data in a communication system, for example, in at least one of a reception antenna diversity scheme-based communication system using a plurality of reception antennas, a transmission antenna diversity scheme-based communication system using a plurality of transmission antennas, and a Multiple Input Multiple Output (MIMO)-based communication system using a plurality of reception antennas and a plurality of transmission antennas. Although the present invention will be described herein with reference to the MIMO communication system by way of example, the data transmission/reception method and system provided in the present invention can be applied to other communication systems.

In addition, the present invention provides a data transmission/reception method and system in a communication system, for improving data throughput and system performance in the full Signal-to-Noise Ratio (SNR) interval for a time-varying wireless channel environment, and reducing the system complexity in the communication system. Further, the present invention provides a data transmission/reception method and system using a hybrid-multiplexing technique that can make use of merits of multiplexing techniques such as Minimum Mean Square Error (MMSE), and Zero-Forcing (ZF)-based Joint-Channel Diagonalization (JCD), as the optimal multiplexing technique for use in the spatial multiplexing MIMO communication system.

Figure 1:
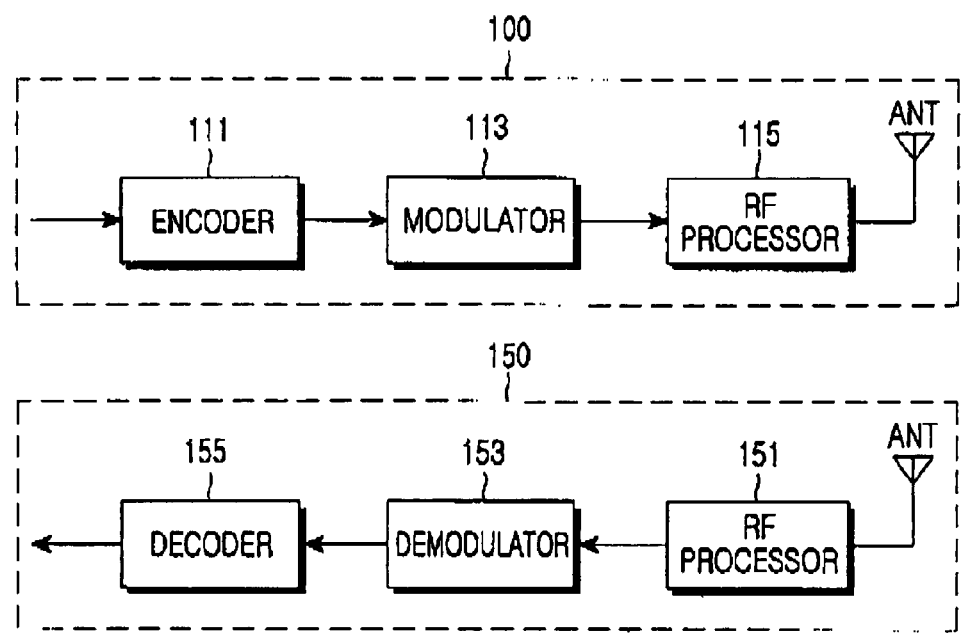
FIG. 1 is a diagram illustrating a structure of a transceiver in a communication system.

FIG. 1 is a diagram illustrating a structure of a transceiver in a communication system.

Referring to FIG. 1, a transmitter 100 includes an encoder 111, a modulator 113 and a Radio Frequency (RF) processor 115, and a receiver 150 includes an RF processor 151, a demodulator 153 and a decoder 155. If information data that the transmitter 100 desires to transmit is generated, the information data is delivered to the encoder 111. The encoder 111 encodes the information data into a coded symbol using a predetermined coding scheme, and outputs the coded symbol to the modulator 113. The modulator 113 modulates the coded symbol into a modulation symbol using a predetermined modulation scheme, and outputs the modulation symbol to the RF processor 115. The RF processor 115 performs RF processing on the signal output from the modulator 113, and transmits the RF-processed signal over the air via an antenna ANT.

The signal transmitted over the air by the transmitter 100 is received at the receiver 150 via an antenna ANT, and the received signal is delivered to the RF processor 151. The RF processor 151 performs RF processing on the received signal, and outputs the RF-processed signal to the demodulator 153. The demodulator 153 demodulates the signal output from the RF processor 151 using a demodulation scheme corresponding to the modulation scheme applied by the modulator 113 of the transmitter 100, and outputs the demodulated signal to the decoder 155. The decoder 155 decodes the signal output from the demodulator 153 using a decoding scheme corresponding to the coding scheme applied by the encoder 111 of the transmitter 100, and outputs the decoded signal as the finally restored information data.

Figure 2:
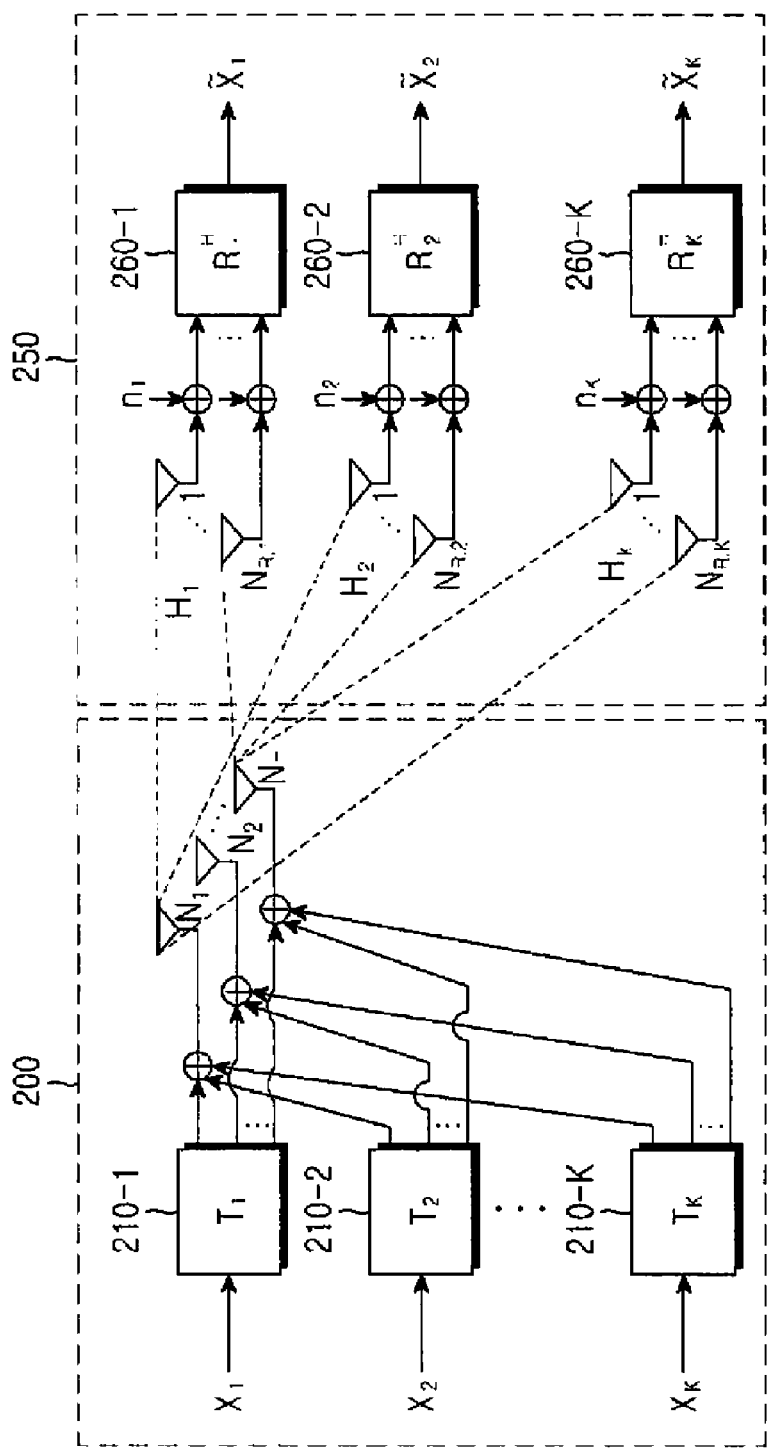
FIG. 2 is a diagram illustrating a structure of a transceiver in a communication system according to the present invention.

FIG. 2 is a diagram illustrating a structure of a transceiver in a communication system according to the present invention. It is assumed in FIG. 2 that the transceiver of the communication system includes $K_T$ transmission units with N transmission antennas, and K reception units with $N_{\{R,K\}}$ reception antennas.

Referring to FIG. 2, in a communication system according to the present invention, a transmitter 200 includes $K_T$ transmission units 210-1, 210-2, and 210-K, $N_T$ summers, each of which sums up the data that the transmission units 210-1, 210-2, and 210-K desire to transmit, and transmits the summed data via one antenna, and $N_T$ antennas for transmitting the data output by the $N_T$ summers over the air, and a receiver 250 includes K reception units 260-1, 260-2 and 260-K, $N_{\{R,K\}}$ antennas included in the K reception units 260-1, 260-2 and 260-K, respectively, for receiving the signals transmitted by the transmitter 200 over the air, and $N_{\{R,K\}}$ summers for summing up Gaussian noises to cancel the noises included in the signals received via the $N_{\{R,K\}}$ antennas.

If data $X_1, X_2, \ldots, X_K$ that the transmitter 200 desires to transmit is generated, the data $X_1, X_2, \ldots, X_K$ is delivered to its associated transmission units 210-1, 210-2 and 210-K, respectively, and the transmission units 210-1, 210-2 and 210-K each perform transmission processing $T_1, T_2, \ldots, T_K$ on the provided data $X_1, X_2, \ldots, X_K$. Thereafter, the transmitter 200 sums up the data on which the transmission units 210-1, 210-2 and 210-K performed transmission processing $T_1, T_2, \ldots, T_K$, using the $N_{\{R,K\}}$ summers, in order to transmit the data to the reception units 260-1, 260-2 and 260-K, and then transmits the summed data $$\sum_{k=1}^{K} T_k x_k$$

over the air via the $N_T$ antennas. Here, the transmitter 200 recognizes channel status information depending on its feedback channel status received from the receiver 250, and transmits the data over the air according to the recognized channel status information.

The signals transmitted over the air by the transmitter 200 are received at the receiver 250 via N antennas that are included in each of the K reception units 260-1, 260-2 and 260-K, and the received signals are delivered to their associated summers. Then the summers sum up Gaussian noises $n_1, n_2, \ldots, n_K$ to cancel the noises included in the received signals, and then delivers the summed signals to the reception units 260-1, 260-2 and 260-K. The reception units 260-1, 260-2 and 260-K each perform reception processing on the received signal $$H_k \sum_{j=1}^{K} T_j x_j + n_k,$$

and generate output signals $\tilde{X}_1, \tilde{X}_2, \tilde{X}_K$. Herein, the output signal $\tilde{X}_K$ can be expressed as set forth in Equation (1).

$$\tilde{x}_k = R_k^H H_k \sum_{j=1}^{K} T_j x_j + R_k^H n_k \qquad (1)$$

In Equation (1), $H_k$ denotes a channel matrix formed between the transmitter 200 with $N_T$ transmission antennas and the receiver 250 with K reception units 260-1, 260-2 and 260-K including $N_{\{R,K\}}$ reception antennas, and $R_k^H$ denotes a reception processing matrix performed by the K reception units 260-1, 260-2 and 260-K.

Equation (1) can be rewritten as set forth in Equation (2).

$$\tilde{x}_k = R_k^H H_k T_k x_k + R_k^H H_k \sum_{j=1, j \neq k}^{K} T_j x_j + R_k^H n_k \qquad (2)$$

If a channel matrix, a transmission processing matrix and a reception processing matrix are defined as their weighting matrixes $H=[H_1^H \ldots H_K^H]$, $T=[T_1 \ldots T_k]$, and R=blockdiag $[R_1^H, \ldots, R_k^H]$, respectively, then Equation (2) can simply be expressed as set forth in Equation (3).

$$\tilde{x} = R^H H T_x + R^H n \qquad (3)$$

In Equation (3), $\tilde{x}=[\tilde{x}_1^H \ldots \tilde{x}_K^H]$, $x=[x_1^H \ldots x_K^H]$, $n=[n_1^H \ldots n_K^H]$, $E[xx^H]=I_L$, $E[\bullet]$ denotes an expectation function, and $I_L$ denotes an identity matrix of a region L. The transmission weighting matrix T satisfies Equation (4) due to the limit of transmission power.

$$E[\|Tx\|^2] = tr(T^H T) P_T \qquad (4)$$

In Equation (4), $\|\bullet\|$ denotes a vector 2-norm, $tr(\bullet)$ denotes a trace operation, and $P_T$ denotes the total transmission power used for data transmission in the transmitter 200. In this manner, the receiver 250 performs reception processing on the data transmitted by the transmitter 200 using Equation (3).

In the communication system according to the present invention, the minimum MMSE value for using the MMSE multiplexing technique for the output signal on which the reception processing of Equation (3) was performed can be defined as set forth in Equation (5) that satisfies conditions as set forth in Equation (6) based on Equation (4).

$$\min_{\{T_k\}; \{R_k\}; \beta} \sum_{k=1}^{K} E[\|\Lambda_k x_k - \beta^{-1} \tilde{x}_k\|^2] \qquad (5)$$

$$\sum_{k=1}^{K} tr(T_k^H T_k) = P_T \qquad (6)$$

Herein, as the transmission weighting matrix T of Equation (4) is conditions for the limit of transmission power as described above, if Equation (3) is substituted in Equation (5), i.e. if Equation (3) is substituted for $\tilde{x}_k$ of Equation (5), Equation (6) can be expressed as set forth in Equation (7).

$$\min_{\{T_k\}; \{R_k\}; \beta} \sum_{k=1}^{K} E\left[\left\|\Lambda_k x_k - \beta^{-1} R_k^H \left(H_k \sum_{j=1}^{K} T_j x_j + n_k\right)\right\|^2\right] \qquad (7)$$

The minimum MMSE value defined as set forth in Equation (7) can be calculated through a Lagrangian function as shown in Equation (8).

$$L(\{T_k\}, \{R_k\}, \beta, \lambda) = \qquad (8)$$
$$\sum_{k=1}^{K} E\left[\left\|\Lambda_k x_k - \beta^{-1} R_k^H \left(H_k \sum_{j=1}^{K} T_j x_j + n_k\right)\right\|\right] + \lambda \left(\sum_{k=1}^{K} tr(T_k^H T_k) - P_T\right)$$

In Equation (8), λ denotes a Lagrange multiplier, and $\Lambda_k$ denotes a non-negative JCD effective channel gain. Accordingly, the MMSE multiplexing technique based on the minimum MMSE value defined as set forth in Equation (7) can obtain high data throughput at the high SNR, as well as at the low SNR. That is, the MMSE multiplexing technique based on the minimum MMSE value defined as set forth in Equation (7) according to the present invention can reduce the system complexity and improve the system performance in the full SNR interval. In the foregoing equations, $\Lambda_k$ denotes a weight of information symbols $x_K$, i.e. $\Lambda_k$ denotes a product of an effective channel gain matrix D obtained through ZF processing and a power control weighting matrix E of the transmitter, and β denotes a scaling factor which is a parameter of a transmission signal transmitted from the transmitter 200, and is a transmitter weight parameter which is calculated as a weight of the transmitter, found through Zero-Forcing at the receiver.

Utilizing Equation (8), the transmission processing matrix $T_K$, the reception processing matrix $R_K$ and the scaling factor β can be expressed as set forth in Equation (9), Equation (10) and Equation (11), respectively.

$$T_k = \beta \left(\sum_{j=1}^{K} H_j^H R_j R_j^H H_j + \lambda \beta^2 I_{N_T}\right)^{-1} H_k^H R_k \Lambda_k \qquad (9)$$

$$R_k = \beta \left(H_k \left(\sum_{j=1}^{K} T_j T_j^H\right) H_k^H + \sigma_k^2 I_{N_{R,k}}\right)^{-1} H_k T_k \Lambda_k \qquad (10)$$

$$\beta = \frac{\sum_{k=1}^{K} tr\left(R_k^H H_k \left(\sum_{j=1}^{K} T_j T_j^H\right) H_k^H R_k + \sigma_k^2 I_{L_k} R_k^H R_k\right)}{\sum_{k=1}^{K} \text{Re}[tr(\Lambda_k R_k^H H_k T_k)]} \qquad (11)$$

Herein, $\sigma_k^2$ denotes a variance of Gaussian noises $n_K$ obtained by the summers of the receiver 250 by summing up the received signals to cancel the noises included in the signals received via the $N_{\{R,K\}}$ antennas, and an average of the Gaussian noises $n_K$ is 0.

An algorithm for calculating the optimal transmission processing matrix $T_K$, reception processing matrix $R_K$ and scaling factor β satisfying Equation (9), Equation (10) and Equation (11), respectively, is as follows. In this algorithm, $\lambda \beta^2$ of Equation (9) is given as ξ.

Step 1. Initialization (i=0):
Evaluate $\Lambda_k$ and $R_{(0),k} = R_{zf,k} \forall k$
Step 2. i=i+1
Update Transmit Processing:

$T_{(i),k}(v) = \beta_{(i)} T'_{(i),k}(v) \forall k,$ where $T'_{(i),k}(v) = (\Sigma_{j=1}^{K} H_j^H R_{(i-1),j} R_{(i-1),j}^H J_j + v I_{N_T})^{-1} H_k^H R_{(i-1),k} \Lambda_k,$ $\beta_{(j)} = P_T^{1/2} [tr(\Sigma_{k=1}^{K} T_{(i),k}(v) T'_{(i),k}^H(v))]^{-1/2}$ and $v = P_T^{-1} tr (\Sigma_{k=1}^{K} \sigma_k^2 R_{(i-1),k}^H R_{(i-1),k})$ Update Receive Processing:

$R_{(i),k} = \rho_{(j)} (H_k (\Sigma_{j=1}^{K} T_{(i),j} T_{(i),j}^H) H_k^H + \sigma_k^2 I_{N_{R,k}})^{-1} H_k T_{(i),k} \Lambda_k \forall k,$ Step 3. Stop, if $\|R_{(j-1),k}-R_{(i),k}v_F^2<\epsilon\forall k$, MT-MMSSE given by $T_k=T_{(j),k}$ and $R_k=\beta_{(i)}^{-1}R_{(i),k}$. Otherwise, go to Step 2.

Here, $\|\cdot\|$ is the Frobenius norm.

In the foregoing algorithm, $v$ denotes $\lambda\beta^2$, and the present invention calculates the optimal transmission processing matrix $T_K$, reception processing matrix $R_K$ and scaling factor $\beta$ satisfying conditions of Equation (9), Equation (10) and Equation (11) by performing the algorithm, and then determines the minimum MMSE value that satisfies Equation (6) and is defined in Equation (7), using Equation (8). That is, in the communication system according to the present invention, the data transmission/reception system calculates the optimal transmission/reception processing according to the channel environment formed by a plurality of transmission/reception antennas, and determines the minimum MMSE value through the calculated transmission/reception processing. Thereafter, the data transmission/reception system transmits/receives data using the MMSE multiplexing technique based on the determined minimum MMSE value.

As can be understood from the foregoing description, the present invention calculates the optimal transmission/reception processing according to the channel environment formed by a plurality of transmission/reception antennas, determines the minimum MMSE value through the calculated transmission/reception processing, and transmits/receives data using the MMSE multiplexing technique based on the determined minimum MMSE value, thereby reducing the system complexity and improving the system performance.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting/receiving data in a spatial multiplexing Multiple Input Multiple Output (MIMO) communication system, the method comprising:

calculating a processing matrix of a transmission unit for transmitting data, a processing matrix of a reception unit for receiving the data, a channel matrix formed by a plurality of transmission antennas and a plurality of reception antennas, and a parameter of the transmission data as a weight of the transmitter found through Zero-Forcing at a receiver, when the data to be transmitted to the plurality of reception antennas via the plurality of transmission antennas is generated;

determining a minimum value of a Minimum Mean Square Error (MMSE) according to a weighted symbol of the transmission data, the calculated processing matrix of the transmission unit, the calculated processing matrix of the reception unit, the channel matrix, the parameter of the transmission data, and Gaussian noise; and transmitting/receiving the data using an MMSE multiplexing scheme based on the determined minimum MMSE value;

wherein the MMSE multiplexing scheme is used for the spatial multiplexing MIMO communication system; and wherein the processing matrix of the transmission unit and the processing matrix of the reception unit are calculated according to the channel matrix formed by the plurality of transmission antennas and the plurality of reception antennas.

2. The method of claim 1, wherein the minimum MMSE value is determined by $$\min_{\{T_k\};\{R_k\};\beta}\sum_{k=1}^{K}E\left[\left\|\Lambda_k X_k-\beta^{-1}R_k^H\left(H_k\sum_{j=1}^{K}T_jx_j+n_k\right)\right\|^2\right],$$

where $x_k$ denotes a symbol of the transmission data, $\Lambda_k$ denotes a weight of the $x_k$, $\beta$ denotes the parameter, $R_k^H$ denotes the processing matrix of the reception unit, $H_k$ denotes the channel matrix, T, denotes the processing matrix of the transmission unit, and $n_k$ denotes Gaussian noise.

3. The method of claim 2, wherein the processing matrix of the transmission unit is calculated by $$T_k=\beta\left(\sum_{j=1}^{K}H_j^H R_j R_j^H H_j+\lambda\beta^2 I_{N_T}\right)^{-1}H_k^H R_k\Lambda_k.$$

4. The method of claim 2, wherein the processing matrix of the reception unit is calculated by $$R_k=\beta\left(H_k\left(\sum_{j=1}^{K}T_j T_j^H\right)H_k^H+\sigma_k^2 I_{N_{R,k}}\right)^{-1}H_k T_k\Lambda_k.$$

5. The method of claim 2, wherein the parameter is calculated by $$\beta=\frac{\sum_{k=1}^{K}tr\left(R_k^H H_k\left(\sum_{j=1}^{K}T_j T_j^H\right)H_k^H R_k+\sigma_k^2 I_{L_k}R_k^H R_k\right)}{\sum_{k=1}^{K}\text{Re}[tr(\Lambda_k(R_k^H)_k T_k)]}$$

where $tr(\cdot)$ denotes a trace operation.

6. The method of claim 2, wherein transmission power of the transmission data is calculated by $$\sum_{k=1}^{K}tr(T_k T_k)=P_T,$$

where $tr(\cdot)$ denotes a trace operation, and $P_T$ denotes a maximum transmission power of the transmission unit.

7. The method of claim 1, wherein the minimum MMSE value is determined through a Lagrangian function.

8. The method of claim 7, wherein the minimum MMSE value is determined by $$L(\{T_k\},\{R_k\},\beta,\lambda)=$$

$$\sum_{k=1}^{K}E\left[\left\|\Lambda_k x_k-\beta^{-1}R_k^H\left(H_k\sum_{j=1}^{K}T_jx_j+n_k\right)\right\|\right]+\lambda\left(\sum_{k=1}^{K}tr(T_k^H T_k)-P_T\right),$$

where $x_k$ denotes a symbol of the transmission data, $\Lambda_k$ denotes a weight of the $x_k$, $\beta$ denotes the parameter, $R_k^H$ denotes the processing matrix of the reception unit, $H_k$ denotes the channel matrix, $T_j$ denotes the processing matrix of the transmission unit, $n_k$ denotes Gaussian noise, $tr(\cdot)$ denotes a trace operation, and $P_T$ denotes maximum transmission power of the transmission unit.

9. A system for transmitting/receiving data in a spatial multiplexing Multiple Input Multiple Output (MIMO) communication system, the system comprising:

a transmitter for calculating a processing matrix of a transmission unit for transmitting data, a processing matrix of a reception unit for receiving the data, a channel matrix formed by a plurality of transmission antennas and a plurality of reception antennas, and a parameter of the transmission data as a weight of the transmitter found through Zero-Forcing at a receiver, when the data to be transmitted to the plurality of reception antennas via the plurality of transmission antennas is generated, determining a minimum value of a Minimum Mean Square Error (MMSE) according to a weighted symbol of the transmission data, the calculated processing matrix of the transmission unit, the calculated processing matrix of the reception unit, the channel matrix, the parameter of the transmission data, and Gaussian noise, and transmitting/receiving the data using an MMSE multiplexing scheme based on the determined minimum MMSE value;

wherein the MMSE multiplexing scheme is used for the spatial multiplexing MIMO communication system; and wherein the processing matrix of the transmission unit and the processing matrix of the reception unit are calculated according to the channel matrix formed by the plurality of transmission antennas and the plurality of reception antennas.

10. The system of claim 9, wherein the minimum MMSE value is determined by $$\min_{\{T_k\};\{R_k\};\beta} \sum_{k=1}^{K} E\left[\left\|\Lambda_k x_k - \beta^{-1} R_k^H \left(H_k \sum_{j=1}^{K} T_j x_j + n_k\right)\right\|^2\right],$$

where $x_k$ denotes a symbol of the transmission data, $\Lambda_k$ denotes a weight of the $x_k$, $\beta$ denotes the parameter, $R_k^H$ denotes the processing matrix of the reception unit, $H_k$ denotes the channel matrix, $T_j$ denotes the processing matrix of the transmission unit, and $n_k$ denotes Gaussian noise.

11. The system of claim 10, wherein the processing matrix of the transmission unit is calculated by $$T_k = \beta \left(\sum_{j=1}^{K} H_j^H R_j R_j^H H_j + \lambda \beta^2 I_{N_T}\right)^{-1} H_k^H R_k \Lambda_k.$$

12. The system of claim 10, wherein the processing matrix of the reception unit is calculated by $$R_k = \beta \left(H_k \left(\sum_{j=1}^{K} T_j T_j^H\right) H_k^H + \sigma_k^2 I_{N_{R,k}}\right)^{-1} H_k T_k \Lambda_k.$$

13. The system of claim 10, wherein the parameter is calculated by $$\beta = \frac{\sum_{k=1}^{K} tr\left(R_k^H H_k \left(\sum_{j=1}^{K} T_j T_j^H\right) H_k^H R_k + \sigma_k^2 I_{L_k} R_k^H R_k\right)}{\sum_{k=1}^{K} \text{Re}[tr(\Lambda_k R_k^H H_k T_k)]},$$

where tr(•) denotes a trace operation.

14. The system of claim 10, wherein transmission power of the transmission data is calculated by $$\sum_{k=1}^{K} tr(T_k^H T_k) = P_T,$$

where tr(•) denotes a trace operation, and $P_T$ denotes a maximum transmission power of the transmission unit.

15. The system of claim 9, wherein the minimum MMSE value is determined through a Lagrangian function.

16. The system of claim 15, wherein the minimum MMSE value is determined by $$L(\{T_k\}, \{R_k\}, \beta, \lambda) =$$

$$\sum_{k=1}^{K} E\left[\left\|\Lambda_k x_k - \beta^{-1} R_k^H \left(H_k \sum_{j=1}^{K} T_j x_j + n_k\right)\right\|\right] + \lambda \left(\sum_{k=1}^{K} tr(T_k^H T_k) - P_T\right),$$

where $x_k$ denotes a symbol of the transmission data, $\Lambda_k$ denotes a weight of the $x_k$, $\beta$ denotes the parameter, $R_k^H$ denotes the processing matrix of the reception unit, $H_k$ denotes the channel matrix, $T_j$ denotes the processing matrix of the transmission unit, $n_k$ denotes Gaussian noise, tr(•) denotes a trace operation, and $P_T$ denotes maximum transmission power of the transmission unit.

* * * * *